2,813,128

NOVEL BENZYL AND BENZAL BROMIDES

William C. Anthony, Kalamazoo Township, Kalamazoo County, Mich., assignor to The Upjohn Company, Kalamazoo, Mich., a corporation of Michigan No Drawing. Application August 4, 1955, Serial No. 526,570

6 Claims. (Cl. 260—612)

The present invention relates to a novel process for the preparation of 4-alkoxy-2-nitrobenzaldehydes and to novel compounds produced therein. More particularly the present invention is concerned with the preparation of 4-alkoxy-2-nitrobenzaldehydes and with novel 4-alkoxy-2-nitrobenzyl bromides and 4-alkoxy-2-nitrobenzal bromides.

The present invention involves the bromination of a starting 4-alkoxy-2-nitrotoluene to produce a 4-alkoxy-2-nitrobenzyl bromide or a 4-alkoxy-2-nitrobenzal bromide, and hydrolyzing the resulting product to produce a 4-alkoxy-2-nitrobenzaldehyde.

The starting 4-alkoxy-2-nitrotoluenes can be prepared by the process disclosed by Knecht, Ann. 215, 88 (1882).

The compounds produced by the present process, 4-alkoxy-2-nitrobenzaldehydes, are important in the preparation of pharmacologically active 6-hydroxytryptamines (6-hydroxy-3-(2-aminoethyl)-indoles). The 6-hydroxytryptamines are produced from the 4-alkoxy-2-nitrobenzaldehydes by the following procedure:

(a). Reacting the 4-alkoxy-2-nitrobenzaldehyde with a 1-nitroalkane in the presence of an alkali-metal hydroxide at a temperature between about zero and about minus forty degrees centigrade, preferably about minus eight degrees centigrade, to produce a 4-alkoxy-2-nitro-α-[1-(1-nitroalkyl)]-benzyl alcohol alkali-metal salt, and thereafter acidifying the thus-produced salt with an inorganic acid to yield a mixture of a 4-alkoxy-β,2-dinitrostyrene and a 4-alkoxy-2-nitro-α-[1-(1-nitroalkyl)]-benzyl alcohol; and (b). Treating the mixture with an aliphatic acid anhydride, e. g., acetic anhydride, at a temperature between about fifty and about 150 degrees centigrade, preferably about eighty degrees centigrade, to dehydrate the 4-alkoxy-2-nitro-α-[1-(1-nitroalkyl)]-benzyl alcohol and thus produce an additional quantity of the 4-alkoxy-β,2-dinitrostyrene; and (c). Subjecting the 4-alkoxy-β,2-dinitrostyrene to reductive cyclization by reacting the styrene with powdered iron in an organic acid medium, such as acetic, propionic, butyric, or the like, at a temperature between about fifty and about 120 degrees centigrade to produce a 6-alkoxyindole; and (d). Reacting the 6-alkoxyindole with an oxalyl halide in the presence of an inert organic solvent, e. g., ether, at a temperature between about ten degrees centigrade and about the boiling point of the solvent utilized, preferably about 25 degrees centigrade, to produce a 6-alkoxy-3-indoleglyoxylyl halide; and (e). Reacting the 6-alkoxy-3-indoleglyoxylyl halide with a primary or a secondary amine, or with ammonia, in the presence of an inert solvent, e. g., an aliphatic hydrocarbon, at a temperature between about zero and about 100 degrees centigrade, preferably about 25 degrees centigrade, to produce a 6-alkoxy-3-indoleglyoxylamide; and (f). Reducing the 6-alkoxy-3-indoleglyoxylamide with lithium aluminum hydride in the presence of an inert solvent, e. g., tetrahydrofuran, and at a temperature between about zero and about 100 degrees centigrade, preferably about zero to about 65 degrees centigrade, to produce a 6-alkoxytryptamine; and (g). Dealkylating the 6-alkoxytryptamine to produce a 6-hydroxytryptamine utilizing aluminum chloride according to the procedure outlined by Asero et al. [Ann. 576, 69–74 (1952)].

The resulting 6-hydroxylated tryptamines possess vasoconstrictor properties similar to 5-hydroxytryptamine (serotonin).

In addition, the resulting tryptamines can also be utilized in the preparation of moth-proofing agents, e. g., the resulting tryptamines can be reacted with fluosilicic acid to form fluosilicate salts which in dilute aqueous solution are effective moth-proofing agents, as more fully disclosed in U. S. Patents 2,075,359 and 1,915,334.

In carrying out the process of the present invention the starting 4-alkoxy-2-nitrotoluene is brominated to the corresponding 4-alkoxy-2-nitrobenzyl (or benzal) bromide using brominating agents such as N-bromoimides, e. g., N-bromophthalimide, N-bromosuccinimide, and the like, as well as N-bromoalkanoamides, e. g., N,N-dibromoacetamide, N-bromoacetamide, N-bromopropionamide, and the like. Bromine can also be utilized to carry out the bromination. Either the 4-alkoxy-2-nitrobenzyl bromide or 4-alkoxy-2-nitrobenzal bromide represented by the formula:

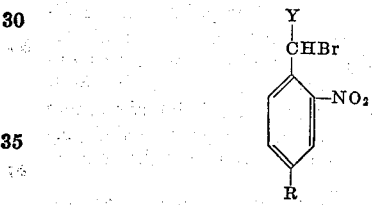

wherein R is a lower-alkoxy radical containing up to nine carbon atoms such as methoxy, ethoxy, propoxy, hexoxy, octoxy, and the like, and Y represents hydrogen or bromine, is produced depending on the quantity of brominating agent which is utilized.

One molar equivalent of bromine, N-bromoimide, or N-monobromoalkanoamide (one-half molar equivalent in the case of N,N-dibromoalkanoamide) is employed to produce the benzyl bromide and two molar equivalents of bromine, N-bromoimide, or N-monobromoalkanoamide (one molar equivalent in the case of N,N-dibromoalkanoamide) are employed to produce the benzal bromide. The reaction is carried out in the presence of an inert solvent such as carbon tetrachloride, methylene chloride, ethylene dibromide, chloroform, bromobenzene, and the like, with carbon tetrachloride being preferred. The reaction proceeds at a temperature between about fifty and about 150 degrees centigrade, with the preferred temperature being about eighty degrees centigrade. The reaction is completed between about two and about thirty hours, the lesser period of time being required at the higher temperatures.

The desired brominated product can be recovered utilizing conventional procedures. For example, the mixture can be filtered at its boiling point to remove extraneous material, the filtrate cooled to about zero degrees centigrade, and the resulting precipitate recrystallized from Skellysolve B (essentially a normal hexane having a boiling range of 140 to 160 degrees Fahrenheit) containing a trace of benzene. Another isolation technique includes the steps of removing the solvent by distillation, drying the residue under reduced pressure, and recrystallizing the resulting crude product from ethanol. The brominated product is then converted to the desired 4-alkoxy-2-nitrobenzaldehyde by hydrolysis. Various hydrolysis techniques can be employed. For example, the benzyl bromide can be oxidatively hydrolyzed by a Sommelet reaction to the aldehyde by refluxing at about 100 degrees centigrade with hexamethylenetetramine (hexamine) and water utilizing acetic acid or an alcohol, e. g., ethanol, as the solvent.

The benzal bromide can readily be hydrolyzed under alkaline or acidic conditions to produce the desired 4-alkoxy-2-nitro-benzaldehyde. Alkaline and acid hydrolyzing agents include calcium carbonate, sodium hydroxide, sodium carbonate, potassium hydroxide, sulfuric acid, hydrochloric acid, phosphoric acid, and the like. The acidic or alkaline hydrolysis is carried out between about fifty degrees and about 150 degrees centigrade for a period between about one hour and about eight hours; the longer period of time being required at the lower temperatures.

The term "hydrolysis" as utilized throughout the specification and claims is intended to cover both the simple hydrolysis of the benzal bromides as well as the oxidative hydrolysis of the benzyl bromides.

The following examples will serve to illustrate the process of this invention, but the said invention is not to be considered as limited thereto.

*Example 1.—Preparation of 6-hydroxy-3-(2-benzylaminoethyl)-indole*

A. 4-METHOXY-2-NITROBENZYL BROMIDE

A mixture of five grams (0.03 mole) of 4-methoxy-2-nitrotoluene, ten milliliters of carbon tetrachloride, and 4.8 grams (0.027 mole) of N-bromosuccinimide was refluxed for forty-five minutes under a strong heat lamp. The mixture was filtered at the boiling point and the filtrate cooled to zero degrees centigrade. The solid was collected from the cooled filtrate and recrystallized from Skellysolve B (essentially a normal hexane having a boiling range of 140 to 160 degrees Fahrenheit) containing a trace of benzene. The yield was 5.8 grams (87.3 percent) of 4-methoxy-2-nitrobenzyl bromide which melted at 62 to 63 degrees centigrade.

*Anal.*—Calcd. for $C_8H_8BrNO_3$: C, 39.04; H, 3.21; Br, 32.47; N, 5.65. Found: C, 39.09; H, 3.56; Br, 32.13; N, 5.96.

B. 4-METHOXY-2-NITROBENZALDEHYDE

A mixture of 19.5 grams (0.79 mole) of 4-methoxy-2-nitrobenzyl bromide, 26.0 grams (0.186 mole) of hexamethylenetetramine, 29 milliliters of acetic acid, and 29 milliliters of water was refluxed for two hours. To the mixture was added 46.5 milliliters of concentrated hydrochloric acid and the resulting mixture was refluxed for fifteen minutes and cooled. The resulting precipitate was collected, washed with water and dried. The product, 4-methoxy-2-nitrobenzaldehyde, weighed 9.9 grams (75.8 percent) and on recrystallization from dilute alcohol melted at 90 to 92 degrees centigrade. The phenylhydrazone melted at 144.5 to 146 degrees centigrade. The 2,4-dinitrophenylhydrazone melted at 214 degrees centigrade.

C. 4-METHOXY-$\beta$,2-DINITROSTYRENE

A mixture of forty grams (0.211 mole) of 4-methoxy-2-nitrobenzaldehyde, 480 milliliters of absolute ethanol, and twenty milliliters of nitromethane was cooled to minus eight degrees centigrade and a solution of 31.0 grams of potassium hydroxide and 25.6 milliliters of water was added over one and one-half hours. The thick mass was stirred for one hour and a solution of 47.5 milliliters of concentrated hydrochloric acid and 47 milliliters of alcohol was added over twenty minutes keeping the temperature below minus five degrees centigrade. The mixture was poured into 2500 milliliters of water and extracted with ether. The ethereal solution was washed with water, dried over magnesium sulfate, and concentrated on a water bath. The residue was then mixed with acetic anhydride and anhydrous sodium acetate and heated on the steam bath for one hour. The crude melt was poured into 2000 milliliters of water, allowed to stand for thirty minutes and filtered. The precipitate was recrystallized from 400 milliliters of alcohol. The resulting product, 4-methoxy-$\beta$,2-dinitrostyrene, weighed 43.4 grams (91.9 percent) and melted at 99.5 to 100 degrees centigrade.

*Anal.*—Calcd. for $C_9H_8N_2O_5$: C, 48.21; H, 3.59; N, 12.49. Found: C, 48.52; H, 3.35; N, 12.38.

D. 6-METHOXYINDOLE

A mixture of 15.9 grams (0.071 mole) of 4-methoxy-$\beta$,2-dinitrostyrene, 850 milliliters of alcohol, and 170 milliliters of acetic acid was warmed to near reflux and 85 grams of iron (100 mesh) was added at once under vigorous stirring. After twenty minutes the mixture was filtered at the boiling point. The precipitate was washed with alcohol and the combined filtrates were poured into 400 milliliters of water. The solid was extracted into ether, and the ether extract was dried over potassium carbonate, and concentrated to yield 10.4 grams of solid. The solid was refluxed in 2000 milliliters of methylcyclohexane and Nuchar (activated carbon) and filtered. Upon cooling, 3.4 grams of 6-methoxyindole was recovered by filtration which melted at 91.5 to 92 degrees centigrade. Concentration of the mother liquor yielded an additional 1.1 grams of 6-methoxyindole. The total yield was 43.2 percent.

E. 6-METHOXY-3-INDOLEGLYOXYLYL CHLORIDE

To a solution of 0.5 gram of 6-methoxyindole and 12.5 milliliters of ether was added 0.5 milliliter of oxalyl chloride. Reaction commenced promptly and after about fifteen minutes the mixture was filtered to yield 0.7 gram of 6-methoxy-3-indoleglyoxylyl chloride which after a thorough washing with ether melted sharply at 150 degrees centigrade.

*Anal.*—Calcd. for $C_{11}H_8ClNO_3$: C, 55.59; H, 3.39; Cl, 14.92; N, 5.89. Found: C, 55.88; H, 3.60; Cl, 14.09; N, 6.26.

F. 6-METHOXY-N-BENZYL-3-INDOLEGLYOXYLAMIDE

To a mixture of 6-methoxy-3-indoleglyoxylyl chloride dissolved in dry benzene was added benzylamine. The mixture was heated, filtered, and the filtrate was concentrated. The resulting solid was recrystallized from isopropanol to yield 6-methoxy-N-benzyl-3-indoleglyoxylamide.

G. 6-METHOXY-3-(2-BENZYLAMINOETHYL)-INDOLE

The 6-methoxy-N-benzyl-3-indoleglyoxylamide was dissolved in tetrahydrofuran, and added to lithium aluminum hydride dissolved in tetrahydrofuran. The mixture was refluxed, concentrated, and cooled in an ice bath while adding water-saturated ether. Sodium hydroxide was also added whereupon the resulting aluminum and lithium residues precipitated. The precipitate was removed by filtration, washed with ether, and the combined filtrate and ether wash was dried over potassium carbonate. The mixture was concentrated, dried under reduced pressure, and the residue was recrystallized from benzene-Skellysolve B (essentially a normal hexane having a boiling range of 140 to 160 degrees Fahrenheit) to yield 6-methoxy-3-(2-benzylaminoether)-indole.

H. 6-HYDROXY-3-(2-BENZYLAMINOETHYL)-INDOLE 6-methoxy-3-(2-benzylaminoethyl)-indole was dealkylated with aluminum chloride using the technique outlined by Asero et al. supra, to produce 6-hydroxy-3-(2-benzylaminoethyl)-indole.

*Example 2.—Preparation of 4-methoxy-2-nitrobenzaldehyde*

A mixture of ten grams (0.041 mole) of 4-methoxy-2-nitrotoluene, twenty milliliters of carbon tetrachloride and 10.6 grams (0.041 mole) of N-bromosuccinimide was refluxed over a heat lamp for forty-five minutes. An additional 10.6 grams of N-bromosuccinimide was added and the mixture refluxed for one additional hour. The hot mixture was filtered. The filtrate, containing 4-methoxy-2-nitrobenzal bromide, was concentrated to dryness and the residue heated in 200 milliliters of water and 4.1 grams of calcium carbonate. The heating was continued for six hours until the calcium carbonate dissolved. After cooling the precipitated solid was collected, refluxed in alcohol-Nuchar (activated carbon) mixture, and filtered. Upon cooling 7.3 grams of 4-methoxy-2-nitrobenzaldehyde was collected.

*Example 3.—4-ethoxy-2-nitrobenzal bromide*

In the same manner as shown in Example 1, part A, 4-ethoxy-2-nitrobenzal bromide was prepared utilizing 4-ethoxy-2-nitrotoluene instead of 4-methoxy-2-nitrotoluene and two molar equivalents of bromine.

*Example 4.—4-propoxy-2-nitrobenzyl bromide*

In the same manner as shown in Example 1, part A, 4-propoxy-2-nitrobenzyl bromide was prepared utilizing 4-propoxy-2-nitrotoluene instead of 4-methoxy-2-nitrotoluene and one molar equivalent of bromine.

*Example 5.—4-hexoxy-2-nitrobenzyl bromide*

In the same manner as disclosed in Example 1, part A, 4-hexoxy-2-nitrobenzyl bromide was prepared utilizing 4-hexoxy-2-nitrotoluene instead of 4-methoxy-2-nitrotoluene and one molar equivalent of N-bromosuccinimide.

*Example 6.—4-octoxy-2-nitrobenzal bromide*

In the same manner as shown in Example 1, part A, 4-octoxy-2-nitrobenzal bromide was prepared utilizing 4-octoxy-2-nitrotoluene instead of 4-methoxy-2-nitrotoluene and one molar equivalent of N,N-dibromoacetamide.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound having the formula:

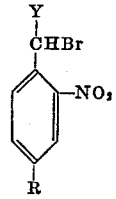

wherein R is a lower-alkoxy radical containing up to nine carbon atoms, and Y is selected from the group consisting of hydrogen and bromine.

2. 4-methoxy-2-nitrobenzyl bromide.
3. 4-methoxy-2-nitrobenzal bromide.
4. 4-ethoxy-2-nitrobenzal bromide.
5. 4-propoxy-2-nitrobenzyl bromide.
6. 4-hexoxy-2-nitrobenzyl bromide.

References Cited in the file of this patent

UNITED STATES PATENTS

| | | |
|---|---|---|
| 1,733,268 | Kyrides | Oct. 29, 1929 |
| 2,576,064 | Britton et al. | Nov. 20, 1951 |

FOREIGN PATENTS

| | | |
|---|---|---|
| 5,533 of 1913 | Great Britain | Feb. 26, 1914 |

OTHER REFERENCES

Segesser et al.: J. Am. Chem. Soc. 64, 825 (1942).
Schmid et al.: Helv. Chim. Acta 29, pgs. 573–581 (1946).